United States Patent [19]

Connolly

[11] Patent Number: 5,379,270

[45] Date of Patent: Jan. 3, 1995

[54] ACOUSTIC-OPTIC SOUND VELOCITY PROFILER

[75] Inventor: George C. Connolly, Waterford, Conn.

[73] Assignee: The United States of America as represented by the Secretary of the Navy, Washington, D.C.

[21] Appl. No.: 217,816

[22] Filed: Mar. 25, 1994

[51] Int. Cl.⁶ ............................ G01S 3/80; G01S 3/78
[52] U.S. Cl. ........................................ 367/128; 367/89
[58] Field of Search ................... 367/128, 902, 89, 90, 367/91; 356/28.5

[56] References Cited

U.S. PATENT DOCUMENTS 4,429,994  2/1984  Guagliardo et al. ............... 356/28.5

*Primary Examiner*—Daniel T. Pihulic
*Attorney, Agent, or Firm*—Michael J. McGowan; Prithvi C. Lall; Michael F. Oglo

[57] ABSTRACT

An apparatus and method for determining the velocity of sound propagation in a fluid as a function of position in the fluid along an axis. A wave of acoustic energy is transmitted along the axis to produce a disturbance that moves in the medium at the velocity of sound. A laser generator transmits a light pulse substantially along the axis through the fluid medium. As the light passes through the disturbance, light backscatters in a characteristic pattern that a detector senses for analysis to provide information concerning the distance traveled and the time of travel for the acoustic wave through the fluid medium and to provide a profile of output characteristic, such as the speed of sound in the medium, as a function of position in the medium.

18 Claims, 2 Drawing Sheets

ACOUSTIC-OPTIC SOUND VELOCITY PROFILER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention generally relates to a method and apparatus for establishing a profile of a characteristic property of a medium along an axis and more specifically to a method and apparatus for measuring such properties as sound velocity in a liquid as a function of depth.

(2) Description of the Prior Art

The velocity of sound through a medium, such as sea water, depends upon a number of factors including the temperature, pressure, density and, in the case of sea water, the salinity of the medium. Density is further a function of the temperature, pressure and salinity of the medium as well. When the medium is sea water, the velocity of sound through the medium can vary due to variations in temperature, salinity, and viscosity. In many situations, however, it is important to obtain an accurate profile of sound velocity or temperature through a medium at various positions along an axis such as depth positions. A number of different approaches have been utilized in the prior art.

For example, U.S. Pat. No. 3,441,901 to Cawley et al. discloses a system for measuring sound velocity in water as a function of depth. In accordance with this patent, a freely sinking probe containing a transducer is launched from a moving vessel and connected thereto by a wire link. A sound transmitter aboard the vessel transmits an acoustic pulse into the water. A transducer on the probe receives this pulse and transmits depth and timing signals to instrumentation through the wire link. The sound velocity as a function of a particular depth of the probe is computed. Additional acoustic pulses are transmitted into the water to obtain a profile of sound velocity as a function of depth.

U.S. Pat. No. 4,926,395 to Boegeman et al. also discloses a method and system for measuring sound velocity. The speed of sound in a fluidic medium is determined from the travel time of an acoustical signal for a predetermined distance in the fluidic medium by generating a cyclical reference signal of a predetermined frequency and transmitting a portion of the reference signal through the medium. The transmitted portion of the reference signal is received after traveling a predetermined distance in the fluidic medium. The cycles of the cyclical reference signal are counted during the period of time between the transmitting and receiving of the portion of the reference signal wherein the travel time of the portion of the reference signal is the number of cycle counts divided by the frequency. The speed of the acoustical signal through the fluidic medium is a function of the path length divided by the travel time.

Another technique for estimating the velocity of sound in sea water is to measure the water temperature as a function of depth and to calculate the sound velocity from well established equations. However this approach provides an indirect measurement of sound velocity and the accuracy can be affected by the accuracy with which the temperature can be measured as well as values of measured or assumed depth and salinity. Typically the instrument used in such measurements is a bathythermograph that measures temperature and depth as it sinks slowly through the ocean water. Readings are then transmitted to a ship with a receiving unit that converts this information into a sound velocity profile.

Alternatively, an instrument with precisely located transducers can be used to measure the velocity of sound between them. These instruments, that generally are not expendable, provide a measure of sound velocity at a single depth and usually comprise a towed body. They must be moved slowly up and down in the ocean to generate a sound velocity profile.

In another method, described in May et al., *Temperature Sounding by RASS with Wind Profiler Radars: A Preliminary Study*, IEEE Trans. on Geoscience and Remote Sensing, Vol.28 No.1 January 1990 (page 19-28), remote measurements of atmospheric temperature profiles are obtained by combining acoustic and radar techniques. Specifically short and long acoustic pulses are suggested with a radar pulse being introduced along the same axis as the acoustic pulse. A coherent radar measures backscattered radiation from fluctuations in atmospheric density induced by acoustic pulses to determine the local speed of sound.

In Vignola et al., *Laser Detection of Sound*, J. Acoust. Soc. Am.90(3), September 1991 (pages 1275-1286) a differential laser-doppler velocimeter measures the Doppler shift of laser light scattered from colloidal micro particles oscillating under the action of the acoustic field.

U.S. Pat. No. 4,429,994 of Guagliardo et al. discloses a system for remotely determining the velocity of sound in water by means of Brillouin scattering measurements. A pulsed laser irradiates water and the apparatus collects backscattered light and collimates this light for transfer through a Fabry-Perot interferometer to a photomultiplier. A ramp generator drives the interferometer for selecting specific frequencies for analysis, so the instantaneous ramp voltage corresponds to the point in a frequency domain to which the digitized output corresponds. A plurality of readings from multiple laser shots is obtained for storage and computer processing to develop a three-dimensional graphic representation the axes of which are frequency, intensity and depth.

None of the foregoing approaches provides a method or apparatus that provides accurate, rapid, direct measurements of sound velocity. The apparatus of the Cawley patent, bathythermographs and fixed transducer structures require significant times to obtain a full profile. The system disclosed by May et al. is directed primarily to systems for measuring temperature profiles in the air; the absorption of radar signals in water and other liquids precludes the use of this approach in measuring velocities in water. The Vignola et al. article and the Guagliardo et al. patent disclose systems that seem to rely upon the interference between laser light and thermal photons that travel in all directions in the medium. The effect is very weak and the returned signals extend over a wide band. Consequently in order to obtain any accurate measurements it is necessary to record a large number of samples. For example, in the Guagliardo patent over two hundred pulses are required in order to obtain a profile and the time to obtain sample is in the order five seconds. Consequently these, as well as other prior approaches, require significant intervals of time for obtaining appropriate data. Moreover in each of these systems the sound profile is normally obtained indirectly through significant processing operations based upon certain assumptions that are subject to errors.

SUMMARY OF THE INVENTION

It the object of this invention to provide a method and apparatus for obtaining a profile of a characteristic property of a liquid or gas medium.

Another object of this invention is to provide a method and apparatus for obtaining a profile of a characteristic property, such as sound velocity or temperature, of a liquid or gas medium using rapid sampling.

Still another object of this invention is to provide a method and apparatus for obtaining accurate profiles of characteristic property of a liquid or gas medium, such as sound velocity and temperature.

In accordance with this invention, the wave of acoustic energy having a given bandwidth is transmitted along an axis through a liquid or gas medium thereby to produce a disturbance in the medium that travels along the axis. A light pulse is transmitted substantially along the same axis and passes through the disturbance. Backscattered light from the interaction of the light pulse and the disturbance caused by the wave of acoustic energy is received and processed for determining the position of the disturbance along the axis and the time at which the light pulse was transmitted. By synchronizing various operations and taking successive measurements, distances can be measured to provide a profile of the characteristic property through fluid medium.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

Figure 1:
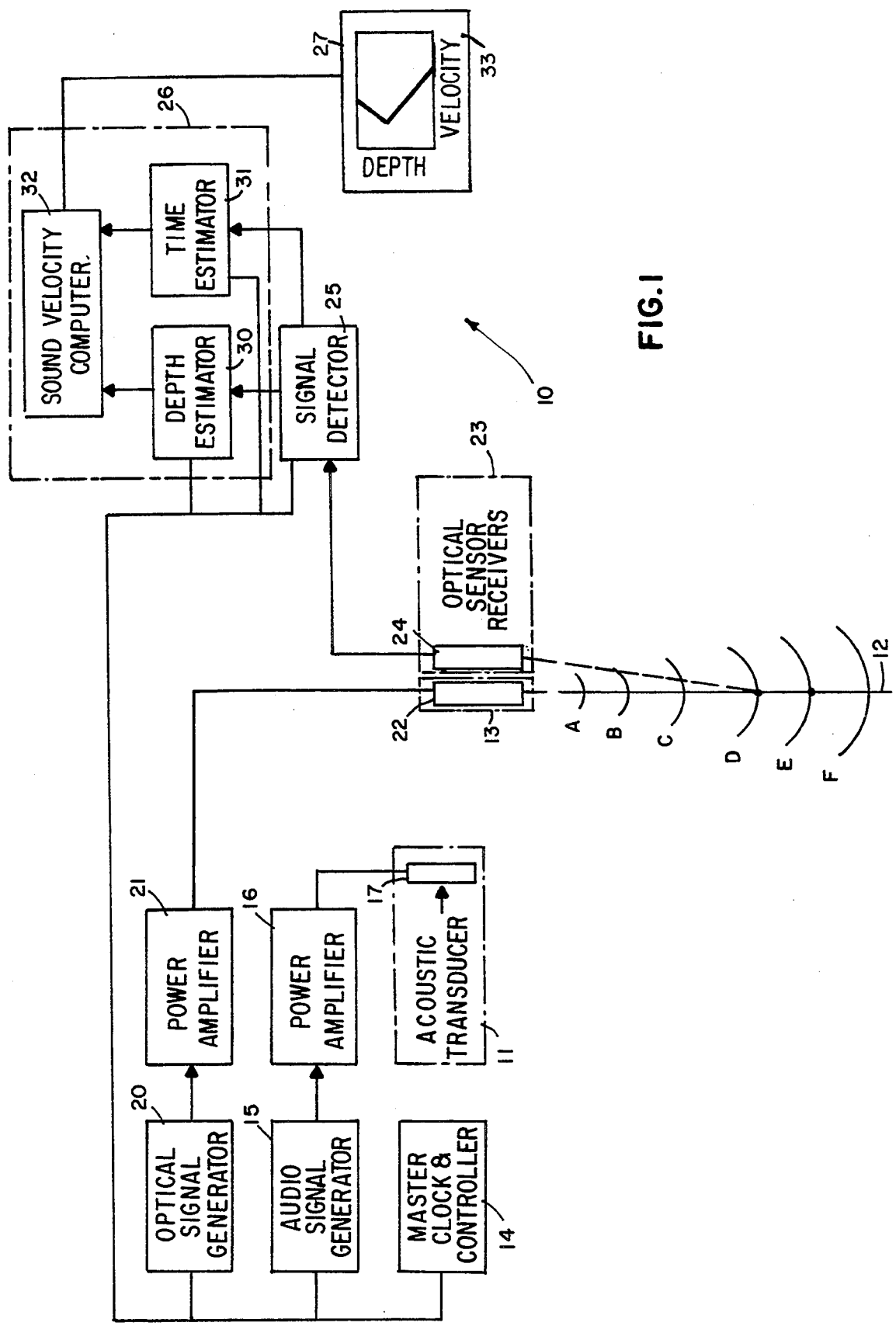
FIG. 1 is a diagram of one embodiment of this invention.

Referring to FIG. 1, a sound velocity profiler 10 constructed in accordance with this invention includes an acoustic transducer 11 that transmits an acoustic wave substantially along an axis 12. Reference letters: A, B, C, D, E, and F represent the propagation of an acoustic wave along the axis 12 through a fluid medium (not shown) in time and thereby represent positions in an acoustic field.

A laser 13 transmits a light pulse along the axis 12. As the laser pulse passes along the axis 12 through the acoustic field, backscattering occurs. Detector circuitry responds to the backscatter from predetermined positions within the acoustic field, such as the positions A through F. The backscattered light at any such position will be modulated by the acoustic field at that position. Consequently a measurement of the backscatter can be used to sense the propagation of the acoustic field past that point.

If the backscatter from the laser pulses are processed to sense or detect the acoustic field at positions $d_{n-1}$, and $d_n$, the times of arrival, $t_{n-1}$ and $t_n$, of the acoustic signal at these positions can be determined. The velocity, $C_n$ of the acoustic signal between any two positions $d_{n-1}$ and $d_n$ then is given by:

$$C_n = \frac{\Delta d_n}{\Delta t_n} = \frac{(d_n - d_{n-1})}{(t_n - t_{n-1})} \tag{1}$$

As shown in FIG. 1, a master clock and controller 14 precisely synchronizes the operation of the acoustic transducer 11 and laser 13. More specifically, an audio signal generator 15 responds to the master clock in controller 14 by generating a pulse input to a power amplifier 16 that in turn energizes an acoustic transducer 17 to transmit the acoustic wave into the fluid medium also the axis 12. An optical signal generator 20 also responds to the master clock in controller 14 by generating a signal that a power amplifier 21 amplifies to fire a laser cavity 22 in the laser 13. Thus this circuitry establishes the timing relationship between the transmission of an acoustic signal and the arrival of that signal at the various positions, such as positions A through F in FIG. 1.

Optical sensors and receivers 23, that includes light detectors circuits 24 and a signal detector 25, receive and analyze the backscattered light using conventional processing techniques to provide input signals so a processor 26 that determines the distance traveled and time of travel for the acoustic wave through the medium for visual presentation on a display 27 or other output device. More specifically, the processor 26 includes a depth estimator 30 and time estimator 31. The depth estimator 30 uses the arrival time provided by the signal detector 25 and the clock pulse information representing the transmission of a laser pulse to determine the round trip time and estimate the depth of the wave front while a time estimator provides a corresponding time value. A sound velocity computer 32 in the processor 26 combines signals from the estimators 20 and 31 according to Equation (1) to provide an output 33 on a sound velocity profile display 27.

FIG. 1 therefore discloses a relatively simple apparatus for providing a sound velocity profile for different depths in a medium where the axis 12 is vertical. There is no requirement for ancillary devices. No separate devices need be towed in or dropped into the water. The entire profiler 10 can be self contained aboard a ship or can be operated from a submerged towed body or submarine. Within the ability of the laser to penetrate the medium, which is dependant primarily upon laser power, frequency and attenuation which is related to the clarity or transmissibility of the fluid, the velocity measurements are accurate. Moreover, the time to acquire all data is essentially the time required for the acoustic wave to travel along the axis to the maximum penetration of the laser light.

The foregoing apparatus has been described in terms of an operating method in which repeated laser pulses are directed along the axis to determine successive positions of a single wave front. It is also possible, if a sufficient depth is involved to eliminate range gating, to allow the audio signal generator to operate as a constant wave device thereby to produce a series of disturbances along the axis in a periodic pattern. If a single laser pulse is then transmitted along the axis, successive backscattering light will reach a modified receiver 24, detector 25 and processor 26 that could be optimized to determine the distribution of the acoustic wave along the axis 12 by analyses of the magnitude of the returned backscattered light as a function of time. This distribution information then could serve as a basis for a velocity-depth profile and could be produced by conventional signal processing techniques.

Figure 2:
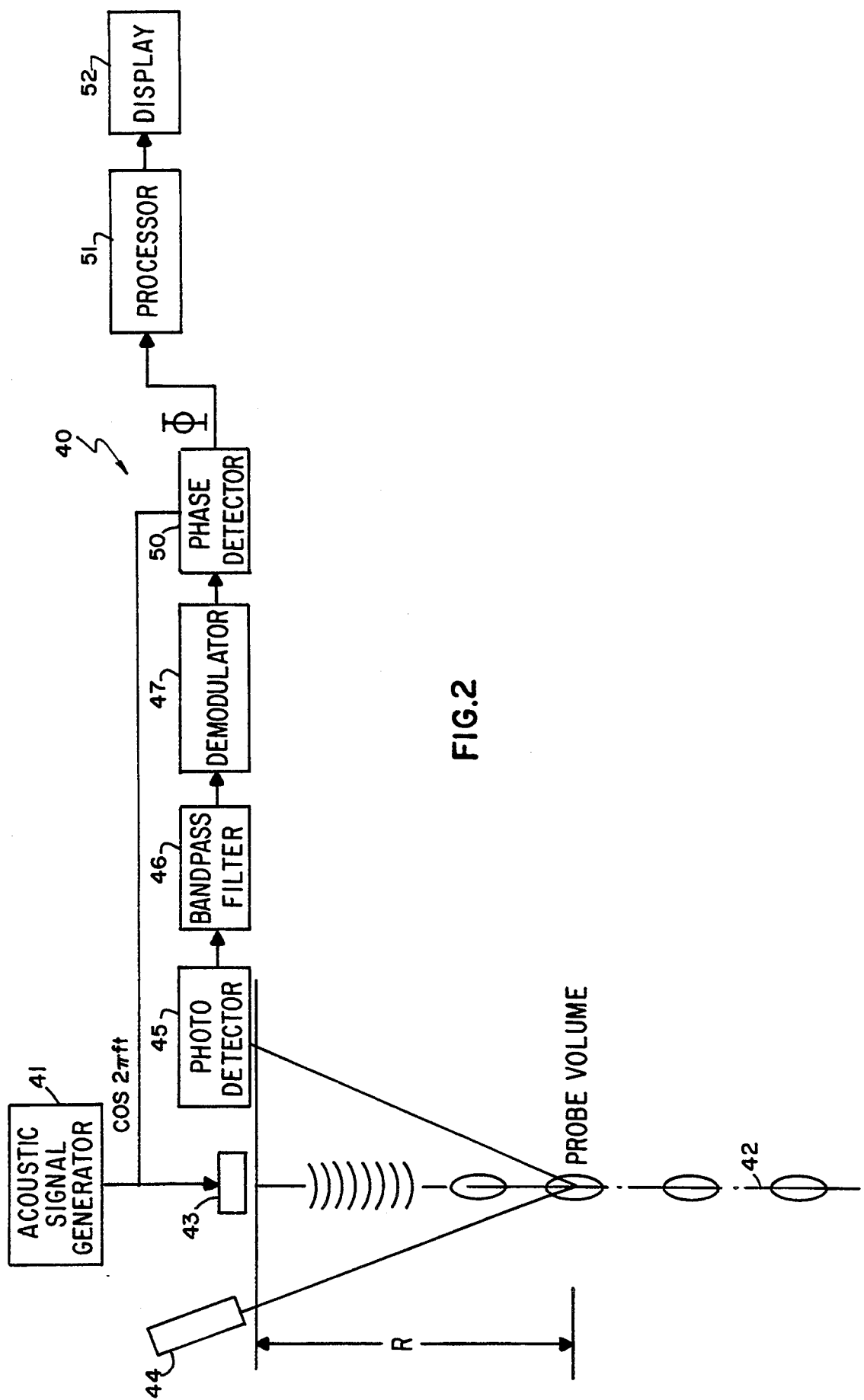
FIG. 2 is a diagram of another embodiment of this invention.

FIG. 2 discloses an alternative embodiment of a profiler 40 in which an acoustic energy generator 41, like the profiler 10 in FIG. 1, transmits a wave front along an axis 42 from a transducer 43. A laser 44, representing a structure such as the generator 20, amplifier 21 and cavity 22 in FIG. 1, directs a light pulse substantially along the axis 42. A photo detector 45 receives backscattered light. In this particular embodiment, a band pass filter 46 and a demodulator 47 process the signal from the photo detector 45 to produce a wave form corresponding to the original wave form transmitted by the acoustic energy generator 41 shifted in phase by an amount dependent upon the distance between the wave front and the transducer 43. A phase detector 50 responds to the acoustic generator 41 to produce a phase difference signal $\Phi$. A processor 51 converts this phase difference signal to a form for presentation on a display 52. With this configuration, the relationship between the phase and a wave position at a distance R from the transducer 43 is given by:

$$R = \frac{c\Phi}{2\pi f} \qquad (2)$$

where f is the frequency of the acoustic energy and c is the velocity of light in the medium. If the processor 51 also monitors the time at which each laser 44 transmission occurs, then an analysis of the positions and interval before successive pulses provides incremental information for a velocity depth profile.

Thus it will be apparent that in each of these embodiments the profiler 10 in FIG. 1 or profiler 40 in FIG. 2 operate according to a method for determining the velocity of sound in a fluid medium as a function of position in the medium along an axis such as the axes 12 and 43 in FIGS. 1 and 2. Moreover, each of the sound velocity profilers can also be used to determine other characteristics of the medium. For example, as previously indicated, a number of factors including temperature determine the velocity of sound in a medium such as sea water. In summary, each of the specifically disclosed and other equivalent profilers utilizing this invention will include a transducer for transmitting a wave of acoustic energy in a predetermined bandwidth along an axis. A laser generator in the form of a laser 13 in FIG. 1 or laser 44 in FIG. 2, will transmit a single light pulse or even a plurality of pulses substantially along the axis for passing through the disturbance. Circuitry, for example optical sensors, receivers 23 and detector 25 in FIG. 1, will receive backscattered light and identify the interaction of the light pulse with the disturbance caused by the advancing acoustic wave. This information will be processed to determine the time of travel for successive samples which can be converted into a distance which, when divided by the travel time, will give the average velocity for that segment or distance along the axis 12 in FIG. 1 or axis 42 in FIG. 2.

The frequency, intensity and wave form of the acoustic energy can be selected to facilitate the measurement, provide security or adjusted for other purposes. Moreover pulsed or continues laser transmissions can be used and the sound can be sensed either by the detection of reflection from particles or variations in the refracted index caused by the acoustic energy. The laser can operate at any frequency that optimizes light propagation through the medium. In general it is, however, essential that the acoustic energy propagate in the medium and be within the band width of the laser detection system used to detect it.

It will be apparent that the specific embodiments of FIGS. 1 and 2 achieve the objectives of this invention. Both provide a profile of a characteristic property of a fluid medium. Sample times are short and the resulting output information is accurate.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. Apparatus for determining a characteristic property as a function of position along an axis of a fluid medium, said apparatus comprising:
   acoustic energy generating means for transmitting a wave of acoustic energy in a given bandwidth along the axis thereby to produce a disturbance in the fluid medium;
   laser generator means for transmitting a light pulse substantially along the axis for passing through the disturbance;
   detector means for receiving backscattered light from the interaction of the light pulse and the disturbance caused by the wave of acoustic energy, the backscattered light being in a bandwidth that includes the given bandwidth of the acoustic energy;
   processing means responsive to said detector means for determining a distance traveled and time of travel for the acoustic wave through the fluid medium; and
   control means for synchronizing the operations of said acoustic energy generating means, said laser generator means, said detector means and said processing means.

2. Apparatus as recited in claim 1 wherein said processing means includes distance estimating means and time estimating means responsive to the interval between the transmission of a light pulse and the receipt of the backscattered light for providing information related to the distance along the axis to the disturbance and the time of the light pulse on a repeated basis.

3. Apparatus as recited in claim 2 wherein said control means includes a master clock means for synchronizing the operation of said apparatus and wherein said acoustic energy generating means, laser generator means, detector means and processor means each connect to said master clock means.

4. Apparatus as recited in claim 2 wherein said acoustic energy generating means includes audio signal generator means for generating an audio signal pulse in response to signals from said control means, power amplifier means for amplifying the audio signal pulse and transducer means responsive to the amplified audio signal for transmitting an acoustic wave into the fluid medium along the axis.

5. Apparatus as recited in claim 2 wherein said laser generator means includes optical signal generator means for generating a light pulse in response to signals from said control means, amplifier means for amplifying the light pulse and for directing the amplified light pulse into the fluid medium along the axis.

6. Apparatus as recited in claim 2 additionally including means for displaying the measured parameter as a function of position along the axis.

7. A method for determining a characteristic property as a function of position along an axis in a fluid medium, said method comprising the steps of:
   transmitting a wave of acoustic energy in a given bandwidth thereby to produce a disturbance that propagates along the axis in the fluid medium;
   transmitting a light pulse substantially along the axis for passing through the disturbance;
   receiving backscattered light from the interaction of the light pulse and the disturbance caused by the wave of acoustic energy, the backscattered light being in a bandwidth that includes the given bandwidth of the acoustic energy;
   determining a distance traveled and time of travel for the acoustic wave through the fluid medium from the arrival time of the backscattered light; and
   synchronizing the transmission of the acoustic energy and light energy and the determination of distance traveled and time of travel thereby to develop a profile of the characteristic property of the medium as a function of position along the axis.

8. A method as recited in claim 7 wherein said determination step includes estimating, for successive light pulses, the position of the disturbance and the time at which the measurement occurs.

9. A method as recited in claim 7 wherein said synchronizing step includes the generating master clock signals for controlling the transmission of acoustic energy and light pulses and for enabling the determination of arrival times of backscattered light.

10. A method as recited in claim 7 wherein the transmission of a wave of acoustic energy includes generating an audio signal pulse in response to the master clocking signals, amplifying the audio signal pulse and converting the amplified audio signal into an acoustic wave that travels along the axis in the fluid medium.

11. A method as recited in claim 9 wherein said transmission of a light pulse includes generating a light control pulse in response to signals from said control means, amplifying the light pulse and transmitting the amplified light pulse along the axis.

12. A method as recited in claim 2 wherein method additionally includes the step of displaying the characteristic property as a function of position along the axis.

13. Apparatus for profiling the velocity of sound in water as a function of water depth comprising:

acoustic energy generating means for transmitting a wave of acoustic energy in a given bandwidth along a depth axis thereby to produce a disturbance in the water that advances along the depth axis;
laser generator means for transmitting a laser pulse substantially along the depth axis through the water for passing through the disturbance;
detector means for receiving backscattered light from the interaction of the laser pulse and the disturbance caused by the wave of acoustic energy, the backscattered light being in a bandwidth that includes the given bandwidth of the acoustic energy;
processing means responsive to signals from said detector means for determining a position along the depth axis and time at which the position is measured;
control means for synchronizing the operations of said acoustic energy generating means, said laser generator means, said detector means and said processing means; and
computer means responsive to successive position and time signals from said processing means for determining the sound velocity of the water at each depth position.

14. Apparatus as recited in claim 13 wherein said processor means includes depth estimating means and time estimating means for providing information to said computer means on a repeated basis representing the advance of the acoustic energy along the axis.

15. Apparatus as recited in claim 14 wherein said control means includes a master clock means for synchronizing the operation of said apparatus and wherein said acoustic energy generating means, laser generator means, detector means and processor means each connect to said master clock means.

16. Apparatus as recited in claim 15 wherein said acoustic energy generating means includes audio signal generator means for generating an audio signal pulse in response to signals from said control means, power amplifier means for amplifying the audio signal pulse and transducer means responsive to the amplified audio signal for transmitting an acoustic wave into the fluid medium.

17. Apparatus as recited in claim 16 wherein said laser generator means includes optical signal generator means for generating a light pulse in response to signals from said control means, power amplifier means for amplifying the light pulse and means for directing the amplified light pulse into the fluid medium.

18. Apparatus as recited in claim 17 additionally comprising means connected to said computer means for displaying the sound velocity as a function of depth.

* * * * *